United States Patent
Fuse et al.

(10) Patent No.: US 8,076,010 B2
(45) Date of Patent: Dec. 13, 2011

(54) MAGNETIC WIRE AND RECORDING MEDIUM

(75) Inventors: Mario Fuse, Kanagawa (JP); Shoji Yamaguchi, Kanagawa (JP); Tsukasa Matsuda, Kanagawa (JP); Eizo Kurihara, Kanagawa (JP); Yasunori Koda, Kanagawa (JP); Kunihiro Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 255 days.

(21) Appl. No.: 11/730,628

(22) Filed: Apr. 3, 2007

(65) Prior Publication Data
US 2008/0013212 A1    Jan. 17, 2008

(30) Foreign Application Priority Data
Jul. 12, 2006  (JP) .................. 2006-191116

(51) Int. Cl.
*B32B 15/00* (2006.01)
(52) U.S. Cl. ............ 428/692.1; 428/537.5; 162/140
(58) Field of Classification Search ....... 428/800–848.9; 235/3, 449, 462.02, 487, 493
See application file for complete search history.

(56) References Cited

U.S. PATENT DOCUMENTS

| | | | |
|---|---|---|---|
| 5,554,232 A | | 9/1996 | Fujimoto et al. |
| 6,270,591 B2 * | | 8/2001 | Chiriac et al. ............. 148/300 |
| 6,747,559 B2 | | 6/2004 | Antonenco et al. |
| 2005/0104947 A1 | | 5/2005 | Ogino et al. |
| 2006/0051528 A1 * | | 3/2006 | Ogino et al. ............. 428/32.21 |
| 2007/0040037 A1 * | | 2/2007 | Koda et al. ............. 235/488 |

FOREIGN PATENT DOCUMENTS

| | | |
|---|---|---|
| JP | A 11-107161 | 4/1999 |
| JP | A 2002-317398 | 10/2002 |
| JP | A 2004-131888 | 4/2004 |
| JP | 2005146477 A * | 6/2005 |

OTHER PUBLICATIONS

English Machine Translation: JP 2002-317398 (2002).*
English Machine Translation: JP 2004-131888 (2004).*
Machine Translation: Fuse et al. (JP 2005-146477); Tatsumi (JP 2004-131888).*
Phys. Rev. 23, 655-660 (1924): G. F. Taylor.
Chinese Office Action dated Jul. 13, 2010 issued against the corresponding Chinese patent application No. 200710096397.9.

* cited by examiner

*Primary Examiner* — Holly Rickman
*Assistant Examiner* — Linda Chau
(74) *Attorney, Agent, or Firm* — Sheldon J. Moss; Chad M. Herring

(57) ABSTRACT

A magnetic wire includes a magnetic metal wire material having a surface coated with a layer of an insulating material. The magnetic wire has a magnetic coercive force of 30 A/m or less and has a Barkhausen effect.

9 Claims, 6 Drawing Sheets

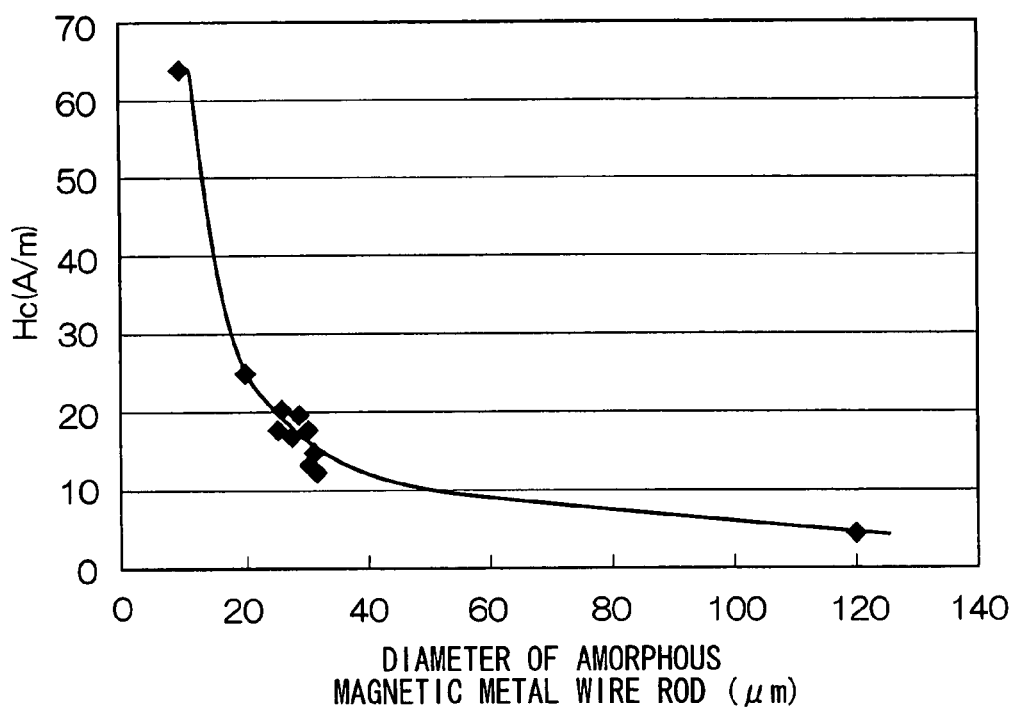
F I G. 2

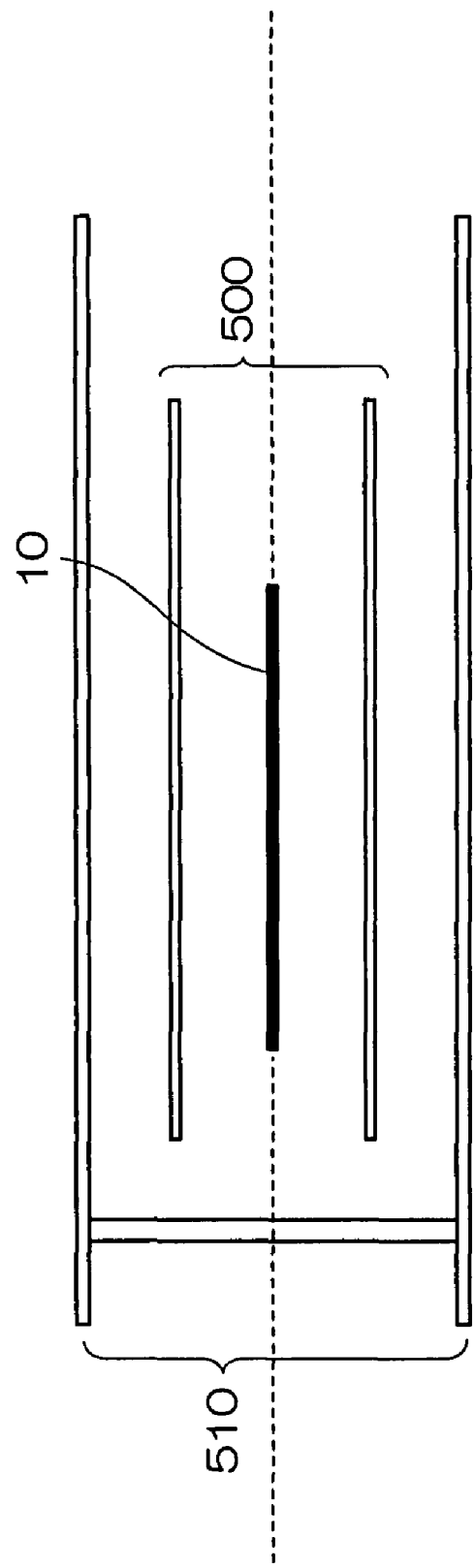

MAGNETIC WIRE AND RECORDING MEDIUM

CROSS-REFERENCE TO RELATED APPLICATION

This application is based on and claims priority under 35 USC 119 from Japanese Patent Application No. 2006-191116, filed Jul. 12, 2006.

BACKGROUND

1. Technical Field

The invention relates to a magnetic wire which is contained in a recording medium that can be used for forming images by an electrophotographic system or the like, and which enables the presence of the recording medium to be detected by a non-contact type magnetic signal detector, and to a recording medium using the same.

2. Related Art

Heretofore, various kinds of paper and components containing magnetic materials have been studied for the prevention of forgery, security for highly confidential information, and other purposes.

SUMMARY

According to an aspect of the present invention, a magnetic wire includes a magnetic metal wire material having a surface coated with a layer of an insulating material. The magnetic wire has a magnetic coercive force of 30 A/m or less and has a Barkhausen effect.

BRIEF DESCRIPTION OF THE DRAWINGS

An exemplary embodiment of the present invention will be described in detail based on the following figures, wherein:

FIGS. 1A to 1C illustrate a Barkhausen effect, wherein:

FIG. 1A is a graph showing B-H characteristics;

FIG. 1B shows graphs showing a current passing through a detection coil when an alternating magnetic field is generated by the exciting coil, wherein the vertical axis of the upper graph represents magnetic field generated by the exciting coil, the vertical axis of the lower graph represents current, and the horizontal axis of the upper and lower graphs represent time; and FIG. 1C is a graph showing a current detected by the detection coil, wherein the vertical axis represents current, and the horizontal axis represents time;

FIG. 2 is a graph showing the change in the magnetic coercive force relative to the diameter of an amorphous magnetic metal wire material (composition: a Co-based amorphous magnetic material containing 50% by weight or more Co);

FIG. 3 is a schematic view for illustrating the method for measuring the magnetic coercive force;

FIGS. 4A to 4C are schematic cross-sectional views showing typical examples of the layer structure of the recording medium of the invention, wherein:

FIG. 4A is a schematic cross-sectional view of a recording medium having a structure in which magnetic wires are arranged at the interface between two laminated paper base layers;

FIG. 4B is a schematic cross-sectional view showing a recording medium having a three layer structure having three laminated paper base layers, wherein magnetic wires are contained in the middle paper base layer among the three laminated paper base layers; and FIG. 4C is a schematic cross-sectional view showing a recording medium having a three layer structure having two paper base layers and an adhesive layer provided between the two paper base layers, wherein magnetic wires are contained in the adhesive layer;

FIGS. 5A to 5C are schematic diagrams showing examples of the arrangement of magnetic wires in the planar direction of the recording medium of the invention, wherein:

FIG. 5A is a schematic diagram showing an example of random distribution of magnetic wires in the planar direction of a recording medium, wherein the length of the magnetic wires is significantly shorter than a side of the recording medium;

FIG. 5B is a schematic diagram showing an example of the arrangement of magnetic wires in curved lines along the longitudinal direction of the recording medium, wherein the magnetic wires extend from one short side to the opposite short side of the recording medium; and FIG. 5C is a schematic diagram showing an example of the arrangement of magnetic wires in linear lines along the longitudinal direction of the recording medium, wherein the magnetic wires extend from one short side to the opposite short side of the recording medium.

DETAILED DESCRIPTION

<Magnetic Wire>

Figure 1A:
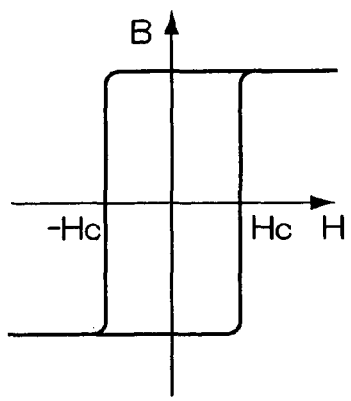

The magnetic wire of an exemplary embodiment of the invention is contained in a recording medium, is capable of emitting magnetic signals detectable with a non-contact type magnetic signal detector, has a magnetic metal wire material whose surface is coated with an insulating material, has a magnetic coercive force of 30 A/m or less, and has a Barkhausen effect.

The non-contact type magnetic signal detector refers to, in a broad sense, a device for detecting the presence of an object by detecting magnetic signals derived from a magnetic material contained in the object with no contact between the device and the object containing the magnetic material. Typical examples of non-contact type magnetic signal detector include a security gate which is installed at the gateway of a shop for detecting magnetic signals derived from a magnetic material contained in a tag for preventing shoplifting. The non-contact type magnetic signal detector which assumed to be used in this exemplary embodiment is capable of forming a magnetic field of at least about 0.1 to 0.8 Oe in a space (detection area) for distinguishing whether or not a certain object passing in the vicinity of the non-contact type magnetic signal detector contains a magnetic material.

The term "at least" means that a magnetic field of about 0.1 to 0.8 Oe is produced in any direction even in the center of the space where the magnetic field is weak.

As described above, the magnetic wire of this exemplary embodiment has a magnetic coercive force of 30 A/m or less, and has a Barkhausen effect. Accordingly, the magnetic wire is capable of emitting magnetic signals which are without fail detectable with a non-contact type magnetic signal detector even in a weak magnetic field (about 0.1 to 0.8 Oe) applied for the detection of magnetic signals emitted from a magnetic material.

If the magnetic coercive force exceeds 30 A/m, the wire cannot emit magnetic signals in a weak magnetic field of about 0.1 to 0.8 Oe. Therefore, the presence of a recording medium (a magnetic wire contained therein) becomes undetectable with a non-contact type magnetic signal detector.

The magnetic coercive force is preferably 25 A/m or less, and more preferably 20 A/m or less for further facilitating the reading of magnetic signals with a non-contact type magnetic signal detector. A lower magnetic coercive force allows the detection of magnetic signals in a weaker magnetic field.

Further, the lower limit of the magnetic coercive force is not particularly limited, but may be 8 A/m or more from the viewpoint of practical application.

A Barkhausen effect is a phenomenon in which abrupt magnetization reversal occurs in response to a periodically vibrating excited magnetic field. Pulsed magnetic signals accompanying the magnetization reversal are detectable with a detection coil. Since a magnetic field which generates a Barkhausen effect is almost equal to the magnetic coercive force, the magnetic coercive force must be 30 A/m or less in order to allow the detection of magnetic signals in a weak magnetic field of 0.8 Oe or less.

Figure 1B:
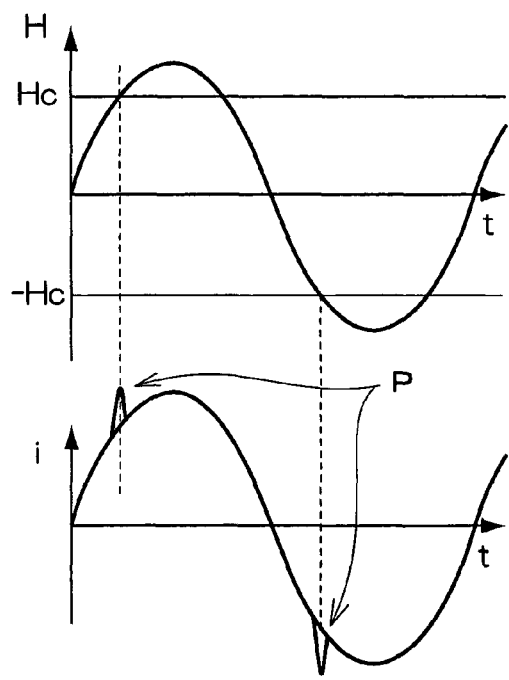
Figure 1C:
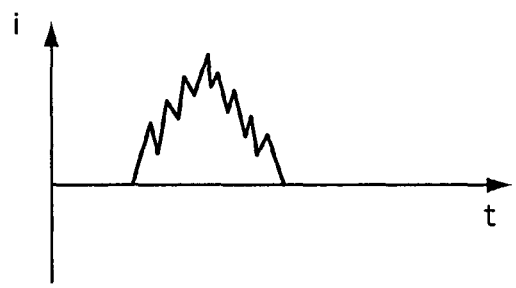

FIGS. 1A to 1C are diagrams for illustrating a Barkhausen effect. A Barkhausen effect is a phenomenon in which abrupt magnetization reversal occurs when a material having B-H characteristics as shown in FIG. 1A, i.e., a material having an approximately rectangular hysteresis loop and a relatively small magnetic coercive force (Hc) (for example, an amorphous magnetic material of Co—Fe—Ni—B—Si) is arranged in an alternating magnetic field. Therefore, when a magnetic material is placed in an alternating magnetic field generated by passing an alternating current through an exciting coil, a pulsed current passes through a detection coil arranged near the magnetic material upon the occurrence of magnetization reversal.

For example, when an alternating magnetic field as shown in the upper graph of FIG. 1B is generated by an exciting coil, a pulsed current as shown in the lower graph of FIG. 1B passes through the detection coil. In FIG. 1B, the peak indicated by a character P represents a pulsed current accompanying magnetization reversal.

However, the current passing through the detection coil includes an alternating current induced by an alternating magnetic field. Therefore, a pulsed current is detected superimposed on the alternating current. Further, when an object containing plural magnetic materials is placed in an alternating magnetic field, a current in which plural pulsed currents are superimposed as shown in FIG. 1C is detected.

Further, when an image is formed by an electrophotographic system, a transfer process is carried out, wherein a toner image is transferred from a photoreceptor or an intermediate transfer medium to a recording medium. The transfer process is achieved by application of an electric field to the interface between a photoreceptor (or intermediate transfer medium) and a recording medium, followed by electrostatical transfer of the toner image from the photoreceptor (or intermediate transfer medium) to the recording medium. Therefore, if electrical resistance on the surface of a recording medium is decreased at a certain part, the toner image is not transferred at that part. This can cause image quality defects such as so-called white patches, or white spots in an image.

The magnetic metal wire material used in the exemplary embodiment has electrical conductivity. Therefore, when the magnetic metal wire material is contained in a recording medium as it is, electrical resistance on the surface of the recording medium is partially decreased, which in turn develops white patches.

However, in the magnetic wire of the exemplary embodiment, the surface of the magnetic metal wire material is coated with an insulating material, which prevents the development of white patches. Therefore, a recording medium using the magnetic wire can also be used as a transfer paper for electrophotography.

Examples of factors for controlling the magnetic coercive force of the magnetic wire of the exemplary embodiment to 30 A/m or less include the diameter and material of the magnetic metal wire material, the shape (diameter and length) of the magnetic wire, the thickness of the coating layer made of an insulating material for coating the magnetic metal wire material, and the conditions of heat treatment after preparation. Among these factors, the diameter of the magnetic metal wire material is particularly influential in controlling the magnetic coercive force to 30 A/m or less.

From the above viewpoint, the average diameter of the magnetic metal wire material used in the magnetic wire is preferably more than 20 μm, and more preferably 25 μm or more. The diameter and magnetic coercive force of the magnetic metal wire material are in inverse proportion as shown in FIG. 2. Therefore, the magnetic coercive force tends to abruptly increase as the average diameter decreases. Accordingly, the magnetic coercive force can exceed 30 A/m when the average diameter is 20 μm or less.

In addition, subtle variations in the diameter which occur during the preparation of a magnetic metal wire material can easily and significantly vary its magnetic coercive force. This may complicate the control of the magnetic coercive force.

Further, when magnetic signals emitted from a magnetic wire in a recording medium are to be detected with a non-contact type magnetic signal detector, the recording medium passes through an arbitrary position in the detection area of the non-contact type magnetic signal detector. Therefore, the distance between the magnetic signal detector and the recording medium (more specifically, the strength of the magnetic field applied to the magnetic wire) is variable during reading of the magnetic signals.

Accordingly, in a recording medium containing plural magnetic wires having an average diameter of 20 μm or less, the magnetic coercive force varies greatly among the magnetic wires contained in the recording medium. When magnetic signals are to be detected from the recording medium, if the distance between the magnetic signal detector and the recording medium is varied during reading of the magnetic signals, the total of the strength of the magnetic signals emitted from the magnetic wires contained in the recording medium tends to vary greatly. As a result, it is not always possible to ensure a high level of detection accuracy regardless of the distance between the magnetic signal detector and the recording medium during reading of the magnetic signals.

FIG. 2 is a graph showing the change in the magnetic coercive force relative to the diameter of an amorphous magnetic metal wire material (composition: a Co-based amorphous magnetic material containing 50% by weight or more Co). The graph shows the result of the measurement using an amorphous magnetic metal wire material having a length of 25 mm at a measuring frequency of 70 Hz. The relationship between the diameter and the magnetic coercive force (Hc) of the amorphous magnetic metal wire material as shown in FIG. 2 is only an example showing the tendency of relative change, and the relationship between the diameter and the magnetic coercive force of the amorphous magnetic metal wire material used in the invention is not limited to the relationship shown in FIG. 2.

Further, in cases where a magnetic metal wire material having an average diameter of 20 μm or less is to be prepared, a preparation method of wiredrawing an already formed wire material as described below is suitable. However, the method is not practical because it costs a lot and gives a low yield.

In addition, the tensile strength is lowered by this method. Therefore, the magnetic wire may easily break in cases where a tensile stress must be applied during the preparation or processing of the magnetic wire, or during the burial of the magnetic wire in a recording medium.

In the exemplary embodiment, the magnetic coercive force of the magnetic wire is measured as follows.

The measurement is performed with an apparatus having an exciting coil and a detection coil arranged within the exciting coil such that the center line of the detection coil is in agreement with the center line of the exciting coil.

Further, as a magnetic wire used for the measurement, a magnetic wire cut into 25 mm pieces is used. The reason for cutting the magnetic wire into 25 mm pieces is to measure the magnetic coercive force of magnetic wire having a typical length for when it is contained in a recording medium.

For the measurement, as shown in FIG. 3, magnetic wires are arranged such that the magnetic wires are roughly aligned with the winding direction of the detection coil of the measuring apparatus, and the magnetic wires are placed on the center line in the detection coil. FIG. 3 is a schematic view illustrating the method for measuring the magnetic coercive force; more specifically, a schematic cross-sectional view showing a state in which a magnetic wire is arranged within a detection coil of a measuring apparatus which has an exciting coil and a detection coil. In FIG. 3, numeral 10 designates a magnetic wire, numeral 500 designates a detection coil, numeral 510 designates an exciting coil, and a dotted line represents the center line of the two coils 500 and 510, wherein coil wires composing the coils are not shown. The exciting coil 510 is connected to an AC power supply (not shown), and the detection coil 500 is connected to a current and voltage monitor (not shown).

Subsequently, a current having a frequency 100 hertz (Hz) and a sine waveform (hereinafter referred to as "exciting current") is passed through the exciting coil 510 in a state as shown in FIG. 3. The exciting current is adjusted such that the peak magnetic field applied to the axial direction of the magnetic wire is 200 A/m. Then, changes in magnetic flux are monitored with the current induced by the detection coil 500. This allows the magnetic field giving rise to changes in magnetic flux to be read as an exciting current value. The magnetic coercive force Hc is calculated by the following formula (1).

$$Hc = 200 (A/m) \times (Vs/V_{200}) \quad \text{Formula (1)}$$

In the formula (1), Vs represents a voltage (V) corresponding to the exciting current giving rise to changes in magnetic flux, and $V_{200}$ represents a voltage (V) corresponding to the exciting current giving a peak magnetic field of 200 A/m.

For example, when a voltage corresponding to the exciting current giving a peak magnetic field of 200 A/m is 2.35 V and a voltage corresponding to the exciting current giving rise to changes in magnetic flux is 0.13 V, the magnetic coercive force Hc is 11.1 A/m.

Since the magnetic coercive force varies with the measuring frequency, the magnetic coercive force must be measured at a constant frequency. The reason for selecting a frequency of 100 Hz in the exemplary embodiment is to improve the tracking of magnetization reversal. The measurement was performed in an environment having a temperature of 25° C. and 50% to 70% humidity.

On the other hand, the magnetic wire is used in a recording medium that is intended for use in image formation by an electrophotographic system, inkjet system, or other systems.

The thickness of the recording medium is 200 μm at most, and usually about 120 to 60 μm. Therefore, the diameter of the magnetic metal wire material must be adjusted such that the maximum sum of the thickness of the magnetic metal wire material and the thickness of the coating layer made of an insulating material for coating the magnetic metal wire material is less than the thickness of the recording medium. The diameter of the magnetic metal wire material is preferably 60 μm or less, more preferably 40 μm or less, and further preferably 36 μm or less. If the average diameter of the magnetic metal wire material exceeds 60 μm, the magnetic wire is exposed at the surface of the recording medium, which disfigures the recording medium, and impairs the appearance of the formed image. Even if the magnetic wire is not exposed at the surface of the recording medium, the portion having the magnetic wire in the recording medium may be bowed outward to form a projection on the surface of the recording medium. In a transfer process for forming an image by an electrophotographic system, the projection may generate a partial gap between a photoreceptor (or intermediate transfer medium) and a recording medium, which can develop transfer voids.

The diameter distribution of the magnetic metal wire material used in the magnetic wire is not particularly limited. However, the diameter distribution of the magnetic metal wire material may be narrow from viewpoint of inhibiting variation in the magnetic coercive force derived from variation in the diameter. When a distribution exists in the diameter of the magnetic metal wire material, the distribution and average of the diameter may be adjusted such that the magnetic coercive force of all the magnetic wires is 30 A/m or less.

The magnetic material composing the magnetic metal wire material suffices should be a soft magnetic material having a Barkhausen effect. A soft magnetic material is not a permanent magnet per se, but can become a magnet with the aid of a coil or permanent magnet. In physical terms, a soft magnetic material is a material in which magnetic dipoles are readily oriented following the direction of an external magnetic field applied to the material. Specific examples of the material are listed in Chapter 10 of "Modern Magnetic Materials" (written by Robert C. O'Handley), John Wiley & Sons, Inc.

Typical examples of soft magnetic materials include a material containing iron (Fe)-silicon (Si) as the main component, a material containing iron (Fe)-nickel (Ni) as the main component, and a material containing iron (Fe)-cobalt (Co) as the main component. Further, in consideration of image formation by an electrophotographic system, the electrical resistance of the soft magnetic material may be high. From that viewpoint, an amorphous magnetic material having three to five times higher resistance than a crystalline magnetic material may be used as a soft magnetic material.

As an amorphous magnetic material, a cobalt-based amorphous magnetic material (cobalt content 50% by weight or more) may be used. The cobalt-based amorphous magnetic material may contain, in addition to Co, at least two elements selected from Fe, Ni, Cr, Nb, Cu, Mn, Mo, Ti, and V, and at least two elements selected from Si, B, and C.

The insulating material for coating the magnetic metal wire material is not particularly limited as long as it is a known insulating material, and an inorganic insulating material such as glass or ceramic, or an organic insulating material such as a resin may be used as the insulating material. In image formation by an electrophotographic system, the insulating material may be an inorganic insulating material with excellent heat resistance such as glass or ceramic, or a heat resistant resin, because the magnetic wire is heated to a high temperature (80° C. to 250° C.) when a toner image transferred to the surface of the recording medium is fixed.

With regard to the combination of a magnetic metal wire material and an insulating material, the magnetic metal wire material and the insulating material for coating the amorphous magnetic metal wire material may be an amorphous magnetic metal wire material and glass, respectively. The magnetic wire may be prepared by the Taylor-Ulitovski method in which drawing of an amorphous magnetic metal and formation of a glass coating layer on the surface of the amorphous magnetic metal wire material are simultaneously achieved.

The Taylor-Ulitovsky method is a method for preparing a wire material by melting a glass tube filled with a magnetic metal material by high-frequency heating, followed by rapid solidification. Details on the preparation method are described in A. V. Ulitovsky, "Method of continuous fabrication of microwires coated by glass", Authors certification USSR patent, No. 128427 (Mar. 9, 1950), or G F. Taylor, Physical Review, Vol. 23 (1924) p. 655. The preparation method is more effective than other methods for preparing a magnetic wire because the method stably and inexpensively produces a magnetic wire having a diameter suitable to the thickness of a recording medium used for image formation by an electrophotographic system or other purposes.

For example, an in-rotating water quenching method, as disclosed in JP-A No. 5-185190, can only produce an amorphous magnetic wire having a diameter of 100 µm or more. Therefore, a formed thick wire must be subjected to wire-drawing treatment for adjusting it to a diameter suitable to the thickness of the recording medium. In addition, a coating layer made of an insulating material must be formed independently.

Examples of known methods for wiredrawing treatment include a method of wiredrawing an original wire having a diameter of 120 µm by drawing it to a diameter of 30 to 50 µm (see JP-A No. 63-240003), and a method of wiredrawing an original wire to a diameter of 5 µm by etching treatment (see JP-A No. 2000-164414). However, preparation of a magnetic wire by the above methods requires increased numbers of processes, and inevitably involves a cost increase due to decreased yield.

Further, by a melt extraction method, in which a wire is mechanically extracted from a metal molten rod using a Mo wheel, the preparation of a thin wire having a diameter suitable to the thickness of a recording medium is difficult and not stable.

On the other hand, when a magnetic wire is produced by the Taylor-Ulitovsky method, wire having an average diameter of an amorphous magnetic metal wire material in a range of from more than 20 µm to 40 µm, and an average thickness of the coating layer made of glass in a range of from 1 µm to 10 µm can be stably prepared.

Further, the average thickness of the coating layer made of glass is preferably in a range of from 1 µm to 10 µm or less, and more preferably in a range of from 1 µm to 5 µm. If the average thickness is less than 1 µm, the formation of the coating layer becomes difficult. In addition, the surface of the amorphous magnetic metal wire material may not be sufficiently coated with glass. On the other hand, if the average thickness exceeds 10 µm, the coating layer may collapse when a bending stress with a small curvature is applied to the magnetic wire.

In the exemplary embodiment, the average diameter of a magnetic metal wire material composing the magnetic wire and the average thickness of the coating layer made of an insulating material are determined as described below.

(1) A magnetic wire wound around a bobbin:

31 points from the winding start to winding end are selected at regular intervals (L/30) as measuring points, wherein L represents the roll length (m). Subsequently, sections at the measuring points are observed with an optical microscope or a scanning electron microscope, and thereby the average of the diameter at the sections and the average of the thickness of the coating layer at the sections are determined.

(2) A magnetic wire cut into pieces of predetermined length and packaged:

Ten pieces of magnetic wire are randomly sampled from ten portions in the package, and the sections at three points (portions adjacent to both ends, and the center, of the pieces) are observed with an optical microscope or a scanning electron microscope, and thereby the average of the diameter at the sections and the average of the thickness of the coating layer at the sections are determined.

(3) A magnetic wire cut into pieces of predetermined length and buried in a recording medium:

Ten pieces of the magnetic wire are randomly extracted from a solution in which one sheet or plural sheets of a recording medium has been dissolved, and determination is performed in the same manner as in (2). When dissolution of the recording medium is difficult, plural sheets of the recording medium are cut, and the sections of randomly extracted 30 points are observed with an optical microscope or a scanning electron microscope, and thereby the average of the diameter at the sections and the average of the thickness of the coating layer at the sections are determined.

The length of the magnetic wire is not particularly limited, but may be 10 mm or more for the occurrence of a Barkhausen effect. The maximum length of the magnetic wire is not particularly limited as long as the magnetic wire contained within the recording medium is not exposed. For example, in order to prevent the magnetic wire from being exposed from a recording medium, the maximum length of the magnetic wire may be 297 mm or less for a recording medium of A4 size, and 1189 mm or less for A0 size.

<Recording Medium>

The recording medium using the magnetic wire of the exemplary embodiment is further described below. The recording medium contains the magnetic wire of the exemplary embodiment. Therefore, when the magnetic wire contained in the recording medium passes through a detection area of a non-contact type magnetic signal detector, the magnetic wire can emit magnetic signals which are detectable by the non-contact type magnetic signal detector.

Accordingly, the recording medium of the exemplary embodiment is, for example, applicable to a security system in which passage of documents containing highly confidential information is monitored by checking to see whether a person passing through a security gate (non-contact type magnetic signal detector), which is installed at the entrance of a room, has taken out a recording medium containing the magnetic wire from the room.

In addition, the recording medium of the exemplary embodiment may have formed thereon an image formed with a known recording method such as an electrophotographic system or an inkjet system. The surface of the magnetic wire contained in the recording medium of the exemplary embodiment is coated with an insulating material, and thus the recording medium is particularly suitable as a transfer paper for electrophotography.

The recording medium of the exemplary embodiment contains, in addition to a magnetic wire, pulp fibers as the main component, and as needed, various materials which are commonly used in ordinary paper media. The layer structure of the recording medium is not particularly limited, but at least includes a paper base containing pulp fibers as the main component, and the paper base may have a multilayer structure having two or more layers. The magnetic wire may be contained in any position in the recording medium across the thickness of the recording medium, but may be basically and particularly contained in the paper base.

The reason for this is as follows. The magnetic wire may be added to the coating layer, but the thickness of a common coating layer is as thin as about 3 to 20 µm. Accordingly, if the diameter of the magnetic wire is decreased in response to the thickness of the coating layer, it becomes very difficult to achieve a magnetic coercive force of 30 m/A or more. Further, the magnetic wires located in the vicinity of the surface of the recording medium tends to form projections on the surface of the recording medium. Accordingly, the projections may cause transfer voids.

On the other hand, the thickness of a paper base is commonly about 60 to 110 µm, which is sufficiently larger than the thickness of a coating layer. In addition, the thickness of a paper base is larger than the diameter of a magnetic wire having a magnetic coercive force of 30 m/A or more, which allows provision of a sufficient margin for preventing the exposure of the magnetic wire at the surface of the recording medium.

Figure 4A:
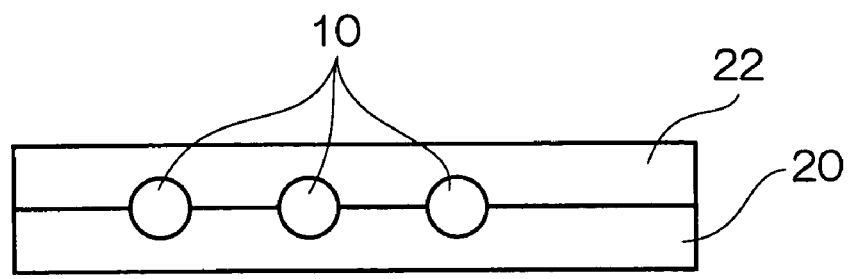
Figure 4B:
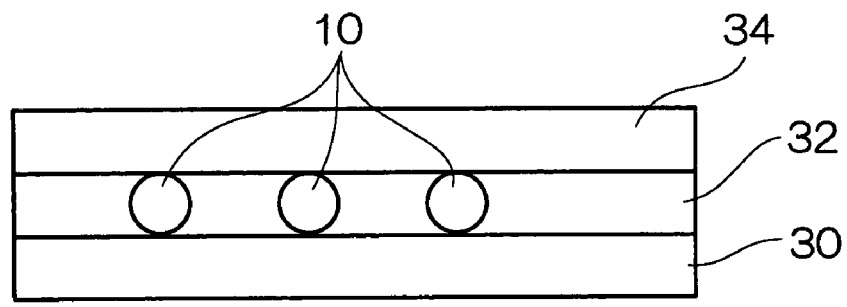
Figure 4C:
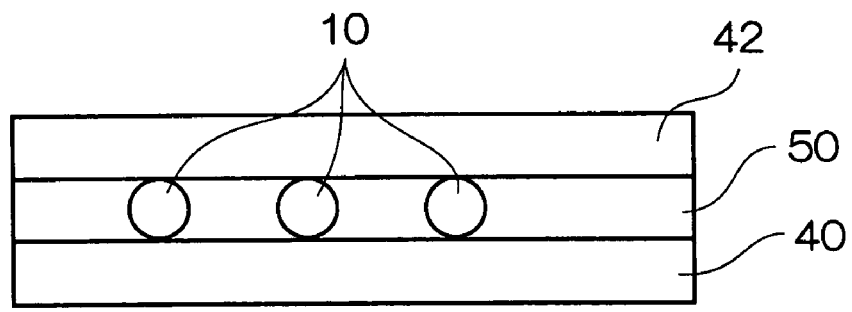

FIGS. 4A to 4C are schematic cross-sectional views showing typical examples of the layer structure of the recording medium of the exemplary embodiment, wherein FIG. 4A shows an example of a two-layer structure, and FIGS. 4B and 4C show examples of a three-layer structure. In FIG. 4, numeral 10 designates magnetic wires, numerals 20, 22, 30, 32, 34, 40, and 42 designate paper base layers, and numeral 50 designates an adhesive layer.

The example shown in FIG. 4A has a structure in which magnetic wires 10 are arranged at the interface between two laminated paper base layers 20 and 22. Further, the paper base layer 20 and the paper base layer 22 are bound to each other by a hydrogen bond formed between pulp fibers contained in the layers. Of course, the above structure in which magnetic wires are arranged at the interface between two layers is applicable to cases where the recording medium has a three- or more layer structure as well as to a two-layer structure. The recording medium shown in FIG. 4A may be prepared, after the paper base layers 20 and 22 are independently prepared, by arranging the magnetic wires on one side surface of either of the layers, and laminating the other layer onto the surface having the magnetic wires.

The example shown in FIG. 4B represents a recording medium having a three-layer structure having three paper base layers 30, 32, and 34 which have been laminated in this order. The magnetic wires 10 are contained in the paper base layer 32 located between the paper base layer 30 and the paper base layer 34. The example shown in FIG. 4C also represents a recording medium having a three-layer structure, wherein the magnetic wire is contained in an adhesive layer 50 provided between a paper base layer 40 and a paper base layer 42.

In the preparation of the recording medium shown in FIG. 4B, the paper base layer 32 is prepared by making a sheet from a paper stock slurry containing dispersed pieces of a magnetic wire. The recording medium shown in FIG. 4B is prepared through a process of laminating the three paper base layers 30, 32, and 34 in such a manner that the paper base layer 32 is located between the two paper base layers.

The recording medium shown in FIG. 4C is prepared through a process of bonding the paper base layer 40 and the paper base layer 42 together using an adhesive which has been previously mixed with pieces of the magnetic wire, or a process of bonding the two paper base layers 40 and 42 together with an adhesive almost simultaneously with sandwiching the magnetic wire between the layers.

Figure 5A:
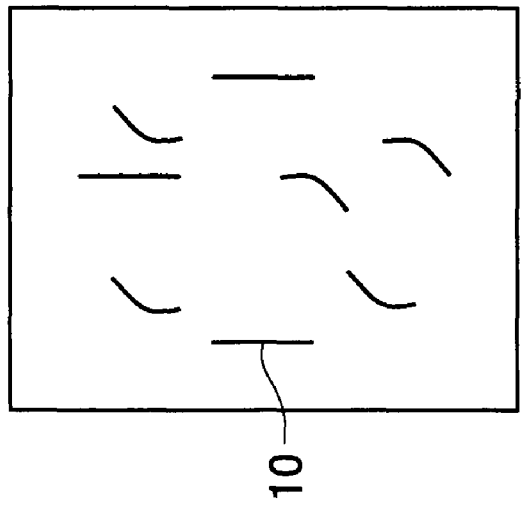
Figure 5B:
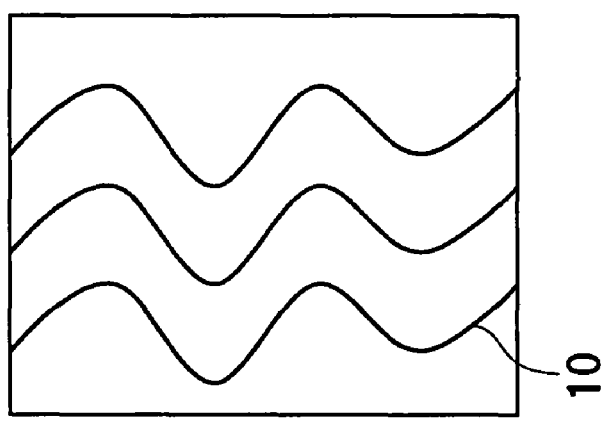
Figure 5C:
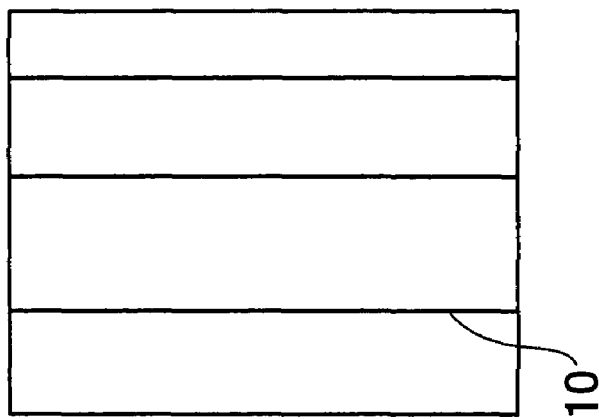

FIGS. 5A to 5C are schematic diagrams showing examples of the arrangement of magnetic wires in the planar direction of the recording medium of the exemplary embodiment. In these figures, numeral 10 indicates magnetic wires. FIG. 5A shows a state in which magnetic wires having a sufficiently shorter length than a side of the recording medium are randomly distributed in the planar direction of a recording medium. FIG. 5B shows a state in which magnetic wires extending from one short side to the opposite short side of a recording medium are arranged in curved lines along the longitudinal direction of the recording medium. FIG. 5C shows a state in which magnetic wires 10 extending from one short side to the opposite short side of a recording medium are arranged in linear lines along the longitudinal direction of the recording medium. As shown in the figures, a single or plural magnetic wires 10 may be contained in the recording medium.

When the magnetic wires are arranged in the planar direction of the recording medium as shown in FIG. 5A, the section of the recording medium may have a structure as shown in FIG. 4A or 4B. On the other hand, when the magnetic wires are arranged in the planar direction of the recording medium as shown in FIG. 5B or 5C, the section of the recording medium may have a structure as shown in FIG. 4C. The combinations of the arrangement of the magnetic wire in the planar direction of the recording medium and the layer structure are not limited to the above-described cases.

Pulp fibers used as the main component of the paper base are not particularly limited, and examples thereof may include hardwood and/or softwood kraft pulp fibers, sulfite pulp fibers, semichemical pulp fibers, chemiground pulp fibers, groundwood pulp fibers, refiner ground pulp fibers, and thermomechanical pulp fibers. Further, the above fibers further containing chemically modified cellulose or hemicellulose also may be used as needed.

In addition, various fibers such as cotton pulp fibers, hemp pulp fibers, kenaf pulp fibers, bagasse pulp fibers, viscose rayone fibers, regenerated cellulose fibers, cuprammonium rayon fibers, cellulose acetate fibers, polyvinyl chloride-based fibers, polyacrylonitrile-based fibers, polyvinyl alcohol-based fibers, polyvinylidene chloride-based fibers, polyolefin-based fibers, polyurethane-based fibers, polyvinyl chloride, fluorocarbon-based fibers, glass fibers, carbon fibers, alumina fibers, metal fibers, and silicon carbide fibers may be used alone or in combination of a plurality thereof Further, from the viewpoint of resource conservation, a pulp made from wood chips obtained from a so-called certified forest which has received a forest certification, planted trees, or lumber from thinned forest may be used.

As needed, fibers prepared by impregnating or heat-sealing the above-described pulp fibers with a synthetic resin such as polyethylene, polypropylene, polystyrene, polyvinyl chloride, or polyester also may be used. Taber abrasion index and inner bond strength are improved thereby.

Further, the above-described pulp fibers may be blended with high-quality and medium-quality recycled pulp. The blending quantity of recycled pulp is determined in accordance with the application, purpose, or the like. For example, when a recycled pulp is blended from the viewpoint of resource conservation, the blending quantity thereof is preferably 10% by mass or more, and more preferably 30% by mass or more relative to the total pulp fibers contained in the paper base. Further, from the viewpoint of resource conservation, a pulp made from wood chips obtained from a so-called certified forest which has received a forest certification, planted trees, or lumber from thinned forest may be used.

For the sake of adjusting opacity, whiteness, and surface properties, a filler may be added to the paper base used in the recording medium of the exemplary embodiment.

The filler which may be used in the above-described paper base is not particularly limited as to its type. Examples of the filler include inorganic fillers such as calcium carbonate-based fillers such as heavy calcium carbonate, light calcium carbonate, and chalk, silicates such as kaolin, sintering clay, pyrophyllite, sericite, and talc, titanium dioxide, calcium sulfate, barium sulfate, zinc oxide, zinc sulfide, zinc carbonate, aluminum silicate, calcium silicate, magnesium silicate, synthetic silica, aluminum hydroxide, alumina, white carbon, saponite, dolomite, calcium montmorillonite, sodium montmorillonite, and bentonite, and organic fillers such as acrylic plastic pigments, polyethylene, chitosan particles, cellulose particles, polyamino acid particles, and styrenes. From the viewpoint of improving image quality maintainability and whiteness in an electrophotographic system, calcium carbonate may be blended in neutral paper making.

Further, various chemical agents such as a size agent may be added internally or externally to the paper base composing the recording medium.

Examples of the size agent which may be added to the paper base include rosin-based size agents, synthetic size agents, petroleum resin-based size agents, and neutral size agents. Further, a size agent such as aluminum sulfate or cationized starch may be combined with a fixing agent.

Among the above-described size agents, from the viewpoint of storage stability of a recording medium on which an image has been formed in an image forming apparatus by an electrophotographic system, a neutral size agent such as an alkenyl succinic anhydride-based size agent, an alkyl ketene dimer, an alkenyl ketene dimer, a neutral rosin, a petroleum size agent, an olefin-based resin, or a styrene-acrylic resin may be used. As a surface size agent, oxidized modified starch, enzyme modified starch, polyvinyl alcohol, modified cellulose such as carboxymethyl cellulose, styrene-acrylic latex, styrene maleic latex, or acrylic latex may be used alone or in combination of thereof.

Further, a paper strengthening agent may be added internally or externally to the paper base composing the recording medium of the exemplary embodiment.

Examples of the paper strengthening agent include starch, modified starch, plant gum, carboxymethyl cellulose, polyvinyl alcohol, modified polyvinyl alcohol, polyacrylamide, styrene-maleic anhydride copolymer, vinyl chloride-vinyl acetate copolymer, styrene-butadiene copolymer, polyacrylic ester urea-formaldehyde resin, melamine-formaldehyde resin, dialdehyde starch, polyethyleneimine, epoxidated polyamide, polyamide-epichlorohydrin-based resin, methylolated polyamide, and chitosan derivatives. These materials may be used alone or in combination of them.

In addition, various auxiliaries commonly blended in ordinary paper media, such as a dye or pH controlling agent may be used as appropriate.

The recording medium of the exemplary embodiment is prepared through a process of bonding together plural paper bases, which have been prepared by mixing the main material composing the above-described paper base with other materials, and forming the mixture into a paper (at least one paper base of the plural paper bases containing a magnetic wire), to prepare a paper base having two or more paper base layers.

The layer structure may be, for example, a structure as shown in FIGS. 4A to 4C. Further, a below-described size press solution may be, as needed, coated on the surface of the paper base, and/or a pigment coating layer may be, as needed, formed on the surface of the paper base. Alternatively, in order to make a recording medium, a below-described size press solution may be, as needed, coated on the surface of the paper base formed in one or mulitiple layers from a raw mixture of the main material for composing the above-described paper base, other materials for composing the paper base, and a magnetic wire, and/or a pigment coating layer may be, as needed, formed on the surface of the paper base formed in one or mulitiple layers from a raw mixture of the main material for composing the above-described paper base, other materials for composing the paper base, and a magnetic wire.

In preparation of a recording medium in which magnetic wires are arranged in the planar direction of the recording medium as shown in FIG. 5B or 5C, the recording medium may be prepared as described below.

More specifically, a recording medium may be prepared through a process of bonding a first paper base which is in a strip form and transferred in its longitudinal direction to a second paper base which is in a strip form, transferred in its longitudinal direction, arranged in opposition to the first paper base, and transferred in the same direction as the first paper base, with an adhesive. On this occasion, the recording medium may be prepared by feeding a magnetic wire with a magnetic wire feeding apparatus, which unidirectionally feeds a magnetic wire wound around a body of rotation such as a roll using motor driving or the like, to between the two paper bases before bonding in such a manner that the transfer direction of the two paper bases is generally in agreement with the axial direction of the magnetic wire.

When the recording medium of the exemplary embodiment is prepared through the above-described process, a tensile stress is applied to the magnetic wire located between the magnetic wire feeding apparatus and the bonding position of the two paper bases. In addition, when a small number of magnetic wires are arranged in the recording medium, tensile stress applied to a piece of magnetic wire is significantly increased. Therefore, when a magnetic metal wire material has a small average diameter and a low tensile strength, the magnetic wire may break at some midpoint, which makes it difficult to prepare recording media as shown in FIG. 5B or 5C in which magnetic wires are arranged in the planar direction of the recording media. However, when the average diameter of the magnetic metal wire material exceeds 20 μm, the above problem can be easily prevented.

Further, when a recording medium as shown in FIG. 5A is prepared, a magnetic wire must be cut into pieces of a desired length. On this occasion, if a magnetic wire having a low tensile strength is cut under tensile stress, the magnetic wire spontaneously breaks at some midpoint, which significantly lowers the working efficiency. However, when the magnetic metal wire material has an average diameter exceeding 20 μm, such a problem can be avoided.

The method for papermaking is not particularly limited. For papermaking, any methods may be used such as a multi-layer papermaking method or a conventionally known fourdrinier machine, cylinder paper machine, or a twin wire system. Either an acidic papermaking method or neutral papermaking method may be used.

As a method for multilayer papermaking, any of a multi-cylinder paper system, fourdrinier multi-cylinder paper system, combination of fourdrinier and cylinder system, multi-head box system, and tammo-fourdrinier system may be used. Other available methods are illustrated in, for example, "Saishin Shoshi Gijutsu-Riron to Jissai" (Latest Papermaking Technology—Theory and Practice" written by Saburo Ishiguro (SeishiKagaku Kenkyujo, 1984). Also, a multi-cylinder system having plural cylinders or the like may be used.

The surface of the paper bases (when the recording medium is composed of plural paper bases, the surface of the outermost paper base) may be coated with a size press solution as described below.

Examples of binders which may be used in a size press solution include raw starch such as corn starch, potato starch, and tapioca starch, and modified starch such as enzyme modified starch, phosphate starch, cationized starch, and acetylated starch. In addition, water-soluble polymers such as polyethylene oxide, polyacrylamide, sodium polyacrylate, sodium alginate, hydroxymethyl cellulose, carboxymethyl cellulose, methyl cellulose, polyvinyl alcohol, Cyamoposis Gum, casein, and curdlan, and derivatives thereof may be used alone or in combination thereof However, the binder is not limited to these. From the viewpoint of production cost, starch is frequently used as a binder due to its low cost.

As a method for applying the size press solution to the surface of the paper base (when the recording medium is composed of plural paper bases, the surface of the outermost paper base), a commonly used coating device may be used, such as size press, shim size, a gate roll, a roll coater, a bar coater, an air knife coater; a rod blade coater or a blade coater.

Further, the recording medium of the exemplary embodiment may be coated on at least one side with a coating solution mainly composed of an adhesive and a pigment, used for forming a pigment coating layer. In this case, the recording medium may be used as a coat paper having a pigment coating layer.

Further, a resin layer may be provided on the pigment coating layer for the sake of obtaining an image having high glossiness.

The resin used as the resin layer is not particularly limited as long as it is a known thermoplastic resin. Examples thereof include resins having an ester bond; polyurethane resins; polyamide resins such as a urea resin; polysulfone resins; a polyvinyl chloride resin, polyvinylidene chloride resin, vinyl chloride-vinyl acetate copolymer resin, and vinyl chloride-vinyl propionate copolymer resin; polyol resins such as polyvinyl butyral, cellulose resins such as an ethyl cellulose resin, and cellulose acetate resin; a polycaprolactone resin, styrene-maleic anhydride resin, polyacrylonitrile resin, polyether resin, epoxy resin, and phenolic resin; polyolefin resins such as a polyethylene resin, polypropylene resin, copolymer resins of olefins such as ethylene and propylene and other vinyl monomers, and acrylic resins.

As the adhesive contained in the coating solution for forming a pigment coating layer, a water-soluble and/or water-dispersible polymer compound(s) used. Examples of the adhesive which may be used include starches such as cationic starch, amphoteric starch, oxidized starch, enzyme modified starch, heat chemical modified starch, esterified starch, and etherified starch, cellulose derivatives such as carboxymethyl cellulose and hydroxyethyl cellulose, natural or semi-synthesized polymer compounds such as gelatin, casein, soybean protein, and natural rubber, polydienes such as polyvinyl alcohol, isoprene, neoprene, and polybutadiene, polyalkenes such as polybutene, polyisobutylene, polypropylene, and polyethylene, vinyl-based polymers and copolymers such as vinyl halide, vinyl acetate, styrene, (meth)acrylic acid, (meth) acrylic ester, (meth)acrylamide, and methyl vinyl ether, synthetic rubber latexes such as styrene-butadiene based and methyl methacrylate-butadiene-based latexes, and synthetic polymer compounds such as a polyurethane resin, polyester resin, polyamide resin, olefin-maleic anhydride resin, and melamine resin. Among these, one or more is selected as appropriate and used in accordance with the intended quality of the recording medium.

Examples of the pigment contained in the coating solution for forming a pigment coating layer include mineral pigments such as heavy calcium carbonate, light calcium carbonate, kaolin, sintered kaolin, structural kaolin, delaminated kaolin, talc, calcium sulfate, barium sulfate, titanium dioxide, zinc oxide, alumina, magnesium carbonate, magnesium oxide, silica, magnesium aluminosilicate, calcium silicate fine particles, magnesium carbonate fine particles, light calcium carbonate fine particles, white carbon, bentonite, zeolite, sericite, and smectite, and organic pigments such as a polystyrene resin, styrene-acryl copolymerization resin, urea resin, melamine resin, acrylic resin, vinylidene chloride resin, benzoguanamine resin, and fine hollow particles and perforated particles thereof Among these pigments, one or more are used.

The mixing proportion of the adhesive relative to the pigment contained in the above-described coating solution for forming a pigment coating layer may be in the range of 5 to 50 parts by mass relative to 100 parts by mass of the pigment. If the mixing proportion of the adhesive relative to 100 parts by mass of the pigment is less than 5 parts by mass, the coating film strength of the coating layer is low, which may cause the generation of paper powder. On the other hand, if the mixing proportion exceeds 50 parts by mass, the adhesive is excessive, which may increase the cost and deteriorate practicality.

To the coating solution for forming a pigment coating layer, various auxiliaries may be appropriately added as needed, and examples thereof include a surfactant, pH controlling agent, viscosity controlling agent, softening agent, gloss agent, dispersant, flowability modifying agent, anti-conductive agent, stabilizing agent, anti-static agent, crosslinking agent, antioxidant, size agent, fluorescent whitening agent, coloring agent, ultraviolet absorber, anti-foaming agent, water resistant additive, plasticizing agent, lubricant, preservative, and fragrant material.

The coating amount of the coating solution for forming a pigment coating layer on the above-described recording paper is appropriately selected in accordance with the intended use of the recording medium of the exemplary embodiment. Usually the coating amount must be enough to completely cover surface irregularities on the recording medium, and preferably 2 to 20 $g/m^2$ in terms of dry mass on one side, and more preferably 2 to 8 $g/m^2$ in consideration of cost.

As a method for applying the above-described coating solution for forming a pigment coating layer to the surface of the paper base which has been coated with the above-described size press solution, a generally known coating apparatus may be appropriately used, and examples thereof include a blade coater, air knife coater, roll coater, reverse roll coater, bar coater, curtain coater, die coater, gravure coater, champlex coater, brush coater, size press coater having a two-roller or metering blade system, bill blade coater, short-dwell coater, and gate roll coater.

The pigment coating layer is provided on a paper base for forming a surface layer on one side or both sides of the recording medium. The surface layer may have a single layer structure, or as needed, a multilayer structure having an intermediate layer. In cases where the coating solution is applied to both sides of a paper base, or the surface layer is formed as a multilayer structure, the amounts of the coating solutions for forming the coating layers, kinds of the above-described materials contained in the coating solutions, and the contents of the above-described materials contained in the coating solutions may not be equal. In this case, the coating solutions for forming the coating layers may be prepared in accordance with the desired quality level within a range which satisfies the ranges stipulated above.

When a pigment coating layer is provided on one side of the recording medium, a synthetic resin layer, a coating layer including an adhesive, pigment and the like, an anti-static layer or other layers may be provided on the other side for the sake of imparting anti-curling property, printability, feeding and delivering properties, and other properties to the recording medium.

Of course, the above-described other side of the recording medium may be further subjected to various processes, for example, posttreatment such as tackifying, magnetization, flame proofing, heat proofing, water proofing, oil proofing, or skid proofing for the sake of imparting suitability for various applications.

Following the application of the above-described size agent, size press solution, and as needed the above-described coating solution for forming a pigment coating layer and others to the surface of the paper base, the recording medium of the exemplary embodiment may be subjected to smoothing treatment using a smoothing apparatus such as a super calender, gloss calender, or soft calender. The smoothing treatment may be appropriately performed on-machine or off-machine, and the configuration of the pressure device, number of pressure nips, and heating conditions may be appropriately adjusted in accordance with an ordinary smoothing apparatus.

The basis weight (JIS P-8124) of the recording medium is not particularly limited, but may be 60 g/m² or more. If the basis weight is less than 60 g/m², the stiffness of the recording medium decreases. Therefore, if such a recording medium is used in an image forming apparatus of an electrophotographic system, image defects may easily occur in the fixing process, in which a toner image transferred to the surface of a recording medium is fixed thereon, due to winding of the recording medium around the fixing device or peel defect of the recording medium from the fixing device.

Further, if the basis weight is less than 60 g/m², the magnetic wire contained in the recording medium tends to be present in the vicinity of the surface of the recording medium. Therefore, transfer voids may occur during image formation with an image forming apparatus of an electrophotographic system.

Further, the moisture percentage of the recording medium immediately after opening the moisture-proof packaging may be within an appropriate range. More specifically, the moisture percentage of the product is preferably 3 to 6.5% by mass, and more preferably about 4.5 to 5.5% by mass. The moisture percentage of the product may be adjusted with a paper machine used for making the base paper, or other means. Further, for the sake of preventing moisture absorption and desorption of the prepared recording medium during storage, the prepared recording medium may be wrapped into packages containing a predetermined number of sheets with a moisture-proof wrapping paper such as a polyethylene laminated paper, or a wrapping material such as polypropylene.

EXAMPLES

The exemplary embodiment of the invention is further illustrated by the following Examples, but is not limited to these Examples.

Example 1

—Preparation of Magnetic Wires—

As a magnetic metal material to be used as a raw material, a metal rod (Co—Fe—Si—Cr—B alloy) having a diameter of 4 to 5 mm is used. The composition ratio of the Co, Fe, Si, Cr, and B elements contained in the metal rod is 82% by weight, 5% by weight, 6% by weight, 4% by weight, and 3% by weight, respectively.

As a glass tube to be filled with the magnetic metal material, a tube made of PYREX® glass (outside diameter: 10 mm, glass thickness: 1.0 mm) is used. PYREX® glass is a trademark of Corning Glass Works, U.S., and a typical composition thereof is $SiO_2$ 81% by weight, $B_2O_3$ 13% by weight, $Na_2O$ 4% by weight, and $Al_2O_3$ 2% by weight.

The tip of the metal rod is inserted into the glass tube. Subsequently, the metal rod in the glass tube is heated with a high frequency heating apparatus at a frequency 440 kHz and an input power of 1 to 2 kW for melting the metal rod in the glass tube.

In this state, the lower edge of the glass tube is pulled toward the direction of gravitational force for wiredrawing, cooled with ion-exchanged water at 25 to 35° C. (electrical resistance: 10 MΩ or more), and then wound at a wire winding rate of 200 m/minute, thus a magnetic metal wire material (magnetic wire) whose surface is coated with glass is obtained.

The thus obtained wire material is not subjected to any aftertreatment to change the magnetic properties, such as heat treatment. This is because such aftertreatment will increase the cost.

The above-described wire material obtained by the Taylor-Ulitovsky method is cut into 25 mm pieces, thus magnetic wires containing an amorphous magnetic metal wire material having a Co—Fe—Si—Cr—B-based composition coated with glass are obtained.

The magnetic wires have a magnetic coercive force of 15.0 A/m, an average diameter of 26 μm at the core layer portion (amorphous magnetic metal wire material), and an average thickness of 4.1 μm in the glass coating layer. The entire circumferential surface of the magnetic wires is observed with a scanning electron microscope and no exposure of the amorphous magnetic metal wire material is observed, and complete coating of the amorphous magnetic metal wire material with a glass coating layer is confirmed.

—Preparation of Recording Medium—

To 100 parts by mass of LBKP (hardwood bleached kraft pulp, freeness: 470 ml), 0.20 parts by mass of a cationized starch (trade name: NISSHOKU NEOTACK #53, manufactured by Nihon Shokuhin Kako Co., Ltd.) and 0.05 parts by mass of alkenyl succinic anhydride (trade name: FIBRAN 81, manufactured by Oji National Co., Ltd.) relative to 100 parts by mass of the pulp solid content in the paper stock slurry are added.

Using a paper stock slurry of the mixture of the above materials (solid content: 0.8% by mass), first and second paper base layers are prepared using an orientation papermaking machine (manufactured by Kumagai Riki Kogyo Co., Ltd.) under the following papermaking conditions.

<Papermaking Conditions>

Drum rotation rate: 1000 revolution/min

Paper stock injection pressure: 1.0 kgf/cm$^2$

Paper stock injection degree: 60°

Number of strokes: 10

On one side of the first paper base layer prepared above, a piece of magnetic wire is arranged in a linearly extended state, and thereon the second paper base layer is laminated. Thus a sheet having two paper base layers containing a magnetic wire at the interface between them is obtained, and the sheet is pressed for one minute under a pressure of 12 kgf/cm$^2$ with a square sheet machine press (manufactured by Kumagai Riki Kogyo Co., Ltd.). The pressed sheet is dried at a heating temperature of 100° C. and a rotation rate of 100 cm/min with a KRK rotary dryer (manufactured by Kumagai Riki Kogyo Co., Ltd.), and thus a recording medium having a paper thickness of 100 μm is obtained.

Example 2

A wire material is prepared in the same manner as in Example 1 except that the wire winding rate in the preparation of the magnetic wires is changed to 60 to 80 m/minute, and the material is cut into pieces having the same length as Example 1, and thus magnetic wires are obtained. Subsequently, a recording medium is prepared in the same manner as Example 1 except that the magnetic wires obtained herein are used.

The magnetic wires obtained above have a magnetic coercive force of 10.3 A/m, an average diameter of 35 μm at the core layer portion (amorphous magnetic metal wire material), and an average thickness of 3.6 μm in the glass coating layer. The entire circumferential surface of the magnetic wires is observed with a scanning electron microscope and no exposure of the amorphous magnetic metal wire material is observed, and complete coating of the amorphous magnetic metal wire material with a glass coating layer is confirmed.

Comparative Example 1

A wire material is prepared in the same manner as in Example 1 except that the composition of the metal rod is changed to Fe$_x$Si$_y$B$_z$ (x=0.77, y=0.15, z=0.08), and the material is cut into pieces having the same length as in Example 1, and thus magnetic wires are obtained. Subsequently, a recording medium is prepared in the same manner as Example 1 except that the magnetic wires obtained herein are used.

The magnetic wires obtained above have a magnetic coercive force of 67 A/m, an average diameter of 15 μm at the core layer portion (amorphous magnetic metal wire material), and an average thickness of 7 μm in the glass coating layer. The entire circumferential surface of the magnetic wires is observed with a scanning electron microscope and no exposure of the amorphous magnetic metal wire material is observed, and complete coating of the amorphous magnetic metal wire material with a glass coating layer is confirmed.

Comparative Example 2

Cut magnetic wires, which are the magnetic wires used at Example 1, are immersed in buffered fluorinated acid to etch the glass layer coating the magnetic metal wire material, and thus an amorphous metal wire material having an uncoated surface is obtained. Subsequently, A recording medium is prepared in the same manner as Example 1 except that the amorphous metal wire material has an uncoated surface.

The etched magnetic wires used for the preparation of the recording medium have a magnetic coercive force of 12 A/m, and an average diameter of 26 μm.

—Evaluation—

The recording media in the Examples and Comparative Examples are evaluated for detection rate when they are passed thorough a non-contact type magnetic signal detector (SAS object monitoring system, manufactured by Unipulse Corp., hereinafter referred to as "detection gate").

Figure 6:
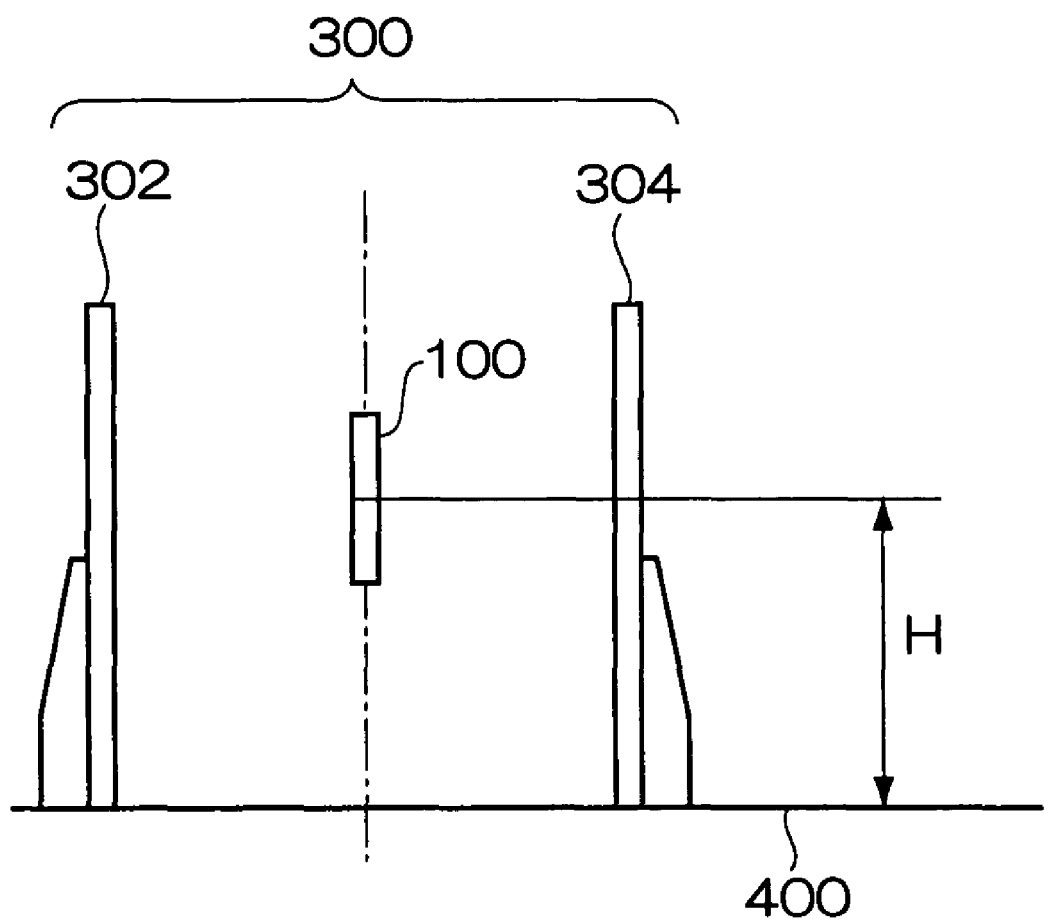
FIG. 6 is a schematic diagram showing the structure of a detection gate used for the evaluation of the Examples.

The detection gate used for the evaluation includes two detectors arranged in pairs, each detector having an exciting coil for forming an alternating magnetic field and a detection coil for detecting the magnetization reversal of magnetic wires in a recording medium 100. FIG. 6 is a schematic diagram showing the structure of the detection gate used in the evaluation of Examples, in which numeral 100 designates a recording medium, numeral 300 designates a detection gate, numeral 302 designates a first detector, numeral 304 designates a second detector, numeral 400 designates a floor, and character H indicates a height from the floor 400.

As shown in FIG. 6, the detection gate 300 includes the first detector 302 and the second detector 304 arranged in opposition to each other on the floor 400. The two detectors 302 and detector 304 have an equivalent structure, and a height of about 2 m. The distance between the two detectors 302 and 304 is about 0.7 m.

For the evaluation, the maximum strength of the alternating magnetic field in the center part between the two detectors 302 and 304 (a dotted line in FIG. 6) is adjusted to about 0.8 Oe at a position where the height H from the floor 400 is about 650 mm, about 0.5 Oe floor at a position where the height from the floor 400 is about 850 mm, and about 0.1 Oe at a position where the height from the floor 400 is about 1050 mm. The detection of the presence or absence of the magnetization reversal of the magnetic wires in the recording medium is performed by monitoring the current generated in the detection coil when the magnetization reversal occurs.

The evaluation is performed by passing the recording medium in the vicinity of the center part between the two detectors 302 and 304 with the height of the recording medium 100 from the floor 400 being kept at about 650, 850, or 1050 mm. The passage test is performed ten times at the same height from the floor (i.e., same maximum alternating magnetic field), and the orientation of the recording medium 100 is randomly changed between each passage test. The number of times of detection is counted, and the detection rate (%) is determined as the ratio of the number of times of detection to the number of passage tests. Table 1 shows various properties of the recording media and magnetic wires contained therein used for the evaluation, and Table 2 shows the results of the above-described detection test and the results of an image quality evaluation (transfer voids) with an image forming apparatus of an electrophotographic system.

TABLE 1

| | Magnetic wire | | | | Recording medium | |
|---|---|---|---|---|---|---|
| | Magnetic coercive force (A/m) | Average diameter of magnetic metal wire material (μm) | Thickness of coating layer made of an insulating material (μm) | Large Barkhausen effect | Paper thickness (μm) | Appearance |
| Example 1 | 15 | 26 | 4.1 | Present | 100 | A |
| Example 2 | 10.3 | 35 | 3.6 | Present | 100 | A |
| Comparative Example 1 | 67 | 15 | 7 | Present | 100 | A |
| Comparative Example 2 | 12 | 26 | 0 | Present | 100 | A |

TABLE 2

| | Detection rate | | | Image quality evaluation Transfer void |
|---|---|---|---|---|
| | Alternating magnetic field = 0.8 Oe | Alternating magnetic field = 0.5 Oe | Alternating magnetic field = 0.1 Oe | |
| Example 1 | A | B | B | A |
| Example 2 | A | A | B | A |
| Comparative Example 1 | C | D | D | A |
| Comparative Example 2 | A | A | B | C |

The evaluation methods and evaluation criteria shown in Tables 1 and 2 are described below.

—Appearance Evaluation of Recording Medium—

The appearance evaluation of the recording medium shown in Table 1 is performed by visually observing the obtained recording medium for evaluating the swelling of the surface of the recording medium derived from magnetic wires. The valuation criteria are as follows.

A: The surface of the recording medium is flat regardless of the location of magnetic wires in the recording medium.

B: The surface of the recording medium is somewhat swelled at positions where magnetic wires exist in the recording medium.

C: The surface of the recording medium is remarkably swelled at positions where magnetic wires exist in the recording medium.

—Image Quality Evaluation—

The image quality evaluation shown in Table 2 is performed by visually observing a black color half tone image, which has been formed with an image forming apparatus of an electrophotographic system (trade name: DocuCenter Color f450, manufactured by Fuji Xerox Co., Ltd.) at a plain paper mode, for evaluating the occurrence of transfer voids. The evaluation criteria are as follows.

A: No transfer voids occur.

B: Image density is low in a portion of the image, which somewhat disfigures the image.

C: White patches occur in a portion of the image, which is problematic for printed matter.

—Detection Rate—

The evaluation criteria for the detection rate shown in Table 2 are as follows.

A: Detection rate is from 90% to 100%.

B: Detection rate is from 80% to less than 90%.

C: Detection rate is from 50% to less than 80%.

D: Detection rate is from 0% to less than 50%.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium comprising a paper base containing pulp fibers as a main component, and the paper base contains a plurality of magnetic wires, wherein:

each of the magnetic wires comprises a magnetic metal wire material having a surface coated with a layer of an insulating material, a magnetic coercive force of each of the magnetic metal wires is 10.3 A/m or more and about 30 A/m or less and each of the magnetic metal wires has a Barkhausen effect, each of the magnetic wires begins at an edge of one short side of the recording medium, extends along a longitudinal direction of the recording medium, and ends at an edge of an opposite short side of the recording medium, and each of the magnetic wires is arranged as a curved line that comprises at least one convex portion and at least one concave portion along the longitudinal direction of the recording medium.

2. The recording medium of claim 1, wherein the paper base comprises two paper base layers, and the plurality of magnetic wires are arranged at an interface between the two paper base layers.

3. The recording medium of claim 1, wherein the paper base comprises three paper base layers, and the plurality of magnetic wires are contained in the paper base layer located at the center of the three paper base layers.

4. The recording medium of claim 1, wherein the paper base comprises two paper base layers and an adhesive layer provided between the two paper base layers, and the plurality of magnetic wires are contained in the adhesive layer.

5. The recording medium of claim 1, wherein the magnetic metal wire material is an amorphous magnetic metal wire material, and the insulating material coating the amorphous magnetic metal wire material is glass.

6. The recording medium of claim 5, wherein the average diameter of the magnetic metal wire material is in a range of from about 25 μm to about 40 μm, and the average thickness of a coating layer for coating the amorphous magnetic metal wire material is in a range of from about 1 μm to about 10 μm.

7. The recording medium of claim 1, wherein the length of each of the magnetic wires is about 10 mm or more.

8. The recording medium of claim 1, wherein the basis weight of the recording medium is about 60g/m$^2$ or more.

9. The recording medium of claim 1, wherein none of the magnetic wires overlap with each other.

* * * * *